(12) United States Patent
Lallouz et al.

(10) Patent No.: US 7,809,576 B2
(45) Date of Patent: Oct. 5, 2010

(54) CUSTOMIZED AUDIO PLAYBACK STORYBOOK WITH LIGHT ACTIVATION

(76) Inventors: Lucient G. Lallouz, 2875 NE. 191 St., Aventura, FL (US) 33180; Sharon J. Fixman-Lallouz, 2875 NE. 191st St., Aventura, FL (US) 33180

( * ) Notice: Subject to any disclaimer, the term of this patent is extended or adjusted under 35 U.S.C. 154(b) by 671 days.

(21) Appl. No.: 11/778,467

(22) Filed: Jul. 16, 2007

(65) Prior Publication Data

US 2008/0015847 A1    Jan. 17, 2008

Related U.S. Application Data

(60) Provisional application No. 60/831,057, filed on Jul. 14, 2006.

(51) Int. Cl.
*G10L 13/00*    (2006.01)
*G09B 5/04*    (2006.01)

(52) U.S. Cl. .................. 704/271; 704/272; 434/317; 345/901

(58) Field of Classification Search ............ 704/260, 704/270, 271, 272; 434/178, 185, 317; 345/901
See application file for complete search history.

(56) References Cited

U.S. PATENT DOCUMENTS

| | | | | |
|---|---|---|---|---|
| 4,884,974 A | * | 12/1989 | DeSmet | 434/317 |
| 5,341,229 A | * | 8/1994 | Rowan | 359/10 |
| 5,502,463 A | * | 3/1996 | Sasaki et al. | 345/204 |
| 5,574,519 A | * | 11/1996 | Manico et al. | 396/429 |
| 5,652,606 A | * | 7/1997 | Sasaki et al. | 345/204 |
| 5,956,682 A | * | 9/1999 | Loudermilk et al. | 704/272 |
| 6,041,215 A | * | 3/2000 | Maddrell et al. | 434/317 |
| 6,064,855 A | * | 5/2000 | Ho | 434/317 |
| 6,516,181 B1 | * | 2/2003 | Kirwan | 434/317 |
| 6,525,706 B1 | * | 2/2003 | Rehkemper et al. | 345/87 |
| 6,788,283 B1 | * | 9/2004 | Blotky et al. | 345/156 |
| 6,865,367 B2 | * | 3/2005 | Kim et al. | 434/317 |
| 6,975,308 B1 | * | 12/2005 | Bitetto et al. | 345/204 |
| 7,010,261 B2 | * | 3/2006 | Kim et al. | 434/317 |
| 7,103,552 B2 | * | 9/2006 | Cornwell | 704/272 |
| 7,224,934 B2 | * | 5/2007 | Mullen | 434/317 |
| 7,422,434 B1 | * | 9/2008 | Krey et al. | 434/178 |
| 7,500,596 B2 | * | 3/2009 | Rathus et al. | 235/375 |
| 2002/0011931 A1 | * | 1/2002 | Johnson et al. | 340/571 |
| 2002/0046034 A1 | * | 4/2002 | Loudermilk et al. | 704/272 |
| 2002/0106621 A1 | * | 8/2002 | Godley | 434/319 |
| 2006/0067546 A1 | * | 3/2006 | Lewis et al. | 381/124 |
| 2007/0134638 A1 | * | 6/2007 | Mullen | 434/317 |
| 2008/0085500 A1 | * | 4/2008 | Lai et al. | 434/317 |
| 2009/0191531 A1 | * | 7/2009 | Saccocci et al. | 434/317 |

\* cited by examiner

*Primary Examiner*—Martin Lerner
(74) *Attorney, Agent, or Firm*—Robert M. Schwartz; David W. Barman

(57) ABSTRACT

A unit for providing an interactive, light-activated, voice recorder unit for a book wherein said interactive voice recorder unit automatically initiates a playback mode when the front cover of a book is opened and light enters the unit.

11 Claims, 5 Drawing Sheets

SECTION A-A

CUSTOMIZED AUDIO PLAYBACK STORYBOOK WITH LIGHT ACTIVATION

INDEX TO RELATED APPLICATIONS

This application claims the benefit of U.S. Provisional Patent Application Ser. No. 60/831,057, filed Jul. 14, 2007, which is incorporated herein by reference in its entirety.

BACKGROUND OF THE INVENTION

This invention relates generally to story books and voice recording devices and more particularly to a combination story book and voice recording device.

Digital recording units convert an audio signal to a digital format creating a digital audio file. The digital audio file is stored, and a playback converts the digitally stored file back to sound audio for playback.

Digital audio is the method of representing audio in digital form.

An analog signal is converted to a digital signal at a given sampling rate and bit resolution; it may contain multiple channels (2 channels for stereo or more for surround sound). Generally speaking: the higher the sampling rate and bit resolution the more fidelity. Both systems introduce noise at the capturing stage, in analogue recording this is due to the noise floor of the circuit, and in digital recording due to quantization noise.

Much like an analog audio system, a digital audio system strives to reproduce the audio perfectly but neither can ultimately prevail. Analog systems have inherent capacitance and inductance which limit the bandwidth of the system and resistance limits the amplitude. Digital systems' sampling rate limits the bandwidth and bit resolution limits the dynamic range (resolution of amplitude creation). Both systems require increased cost and attention to achieve higher fidelity.

A digital audio signal starts with an analog-to-digital converter (ADC) that converts an analog signal to a digital signal. The ADC runs at a sampling rate and converts at a known bit resolution. For example, CD audio has a sampling rate of 44.1 kHz (44,100 samples per second) and 16-bit resolution for each channel (stereo). If the analog signal is not already bandlimited then an anti-aliasing filter is necessary before conversion, to prevent aliasing in the digital signal. (Aliasing occurs when frequencies above the Nyquist frequency have not been band limited, and instead appear as audible artifacts in the lower frequencies).

Some audio signals such as those created by digital synthesis originate entirely in the digital domain, in which case analog to digital conversion does not take place.

After being sampled with the ADC, the digital signal may then be altered in a process which is called digital signal processing where it may be filtered or have effects applied.

The digital audio signal may then be stored or transmitted. Digital audio storage can be on a CD, an iPod, a hard drive, USB flash drive, CompactFlash, or any other digital data storage device. Audio data compression techniques—such as MP3, Ogg Vorbis, or AAC—are commonly employed to reduce the size. Digital audio can be streamed to other devices.

The last step for digital audio is to be converted back to an analog signal with a digital-to-analog converter (DAC). Like ADCs, DACs run at a specific sampling rate and bit resolution but through the processes of oversampling, upsampling, and downsampling, this sampling rate may not be the same as the initial sampling rate.

The DAC fundamentally converts finite-precision numbers (usually fixed-point binary numbers) into a physical quantity, usually an electrical voltage. Normally the output voltage is a linear function of the input number. Usually these numbers are updated at uniform sampling intervals and can be thought of as numbers obtained from a sampling process. These numbers are written to the DAC, sometimes along with a clock signal that causes each number to be latched in sequence, at which time the DAC output voltage changes rapidly from the previous value to the value represented by the currently latched number. The effect of this is that the output voltage is held in time at the current value until the next input number is latched resulting in a piecewise constant output. This is equivalently a zero-order hold operation and has an effect on the frequency response of the reconstructed signal.

Piecewise constant signal is typical of a practical DAC output. The fact that practical DACs do not output a sequence of dirac impulses (that, if ideally low-pass filtered, result in the original signal before sampling) but instead output a sequence of piecewise constant values or rectangular pulses, means that there is an inherent effect of the zero-order hold on the effective frequency response of the DAC resulting in a mild roll-off of gain at the higher frequencies (a 3.9224 dB loss at the Nyquist frequency).

The prior art teaches the use of, so called "talking books" but does not teach a combination story book and detachable audio device for recording the storyline of each story book whereby the audio playback is initiated from a light sensor and does not require any action on the part of the reader to initiate playback, other than opening the front cover.

BRIEF SUMMARY OF THE INVENTION

The Interactive Digital recording unit of the present invention converts an audio signal to a digital format, thus creating a digital audio file. The digital audio file is stored, and an audio playback circuit converts the digitally stored file back to sound audio for playback.

In one embodiment, the present invention is an interactive digital recording and playback unit for providing audio to a book, said unit comprising;
  a) a microphone;
  b) an audio recording circuit for converting an audio signal input into said unit into a digital audio file;
  c) a memory to receive and store said digital audio file;
  d) an audio playback circuit;
  e) a light sensing actuator for initiating said playback; and
  f) a clip for securing said unit to a book.

Digital audio recording and playback circuits incorporated into the present invention are well known in the art. Digital recording units that record sound as digital sound files and convert the digital sound files for subsequent playback are described above.

In a preferred embodiment, the actuator for said audio record circuit and the actuator for said audio playback are on opposite sides of said unit.

The unit has a light sensing actuator that initiates an audio playback of prerecorded information. The light sensing actuator initiates audio playback when exposed to light and said audio playback continues to play audio independent of any additional or continual source of light. This provides a unit that will commence audio playback when, for example, the unit is secured to the inside cover of a book, and the book is opened. As a user turns the pages, even though the actuator may be covered and no longer exposed to light, the audio continues to play.

Preferably, the unit has a clip configured to fit on the inside cover of a book. Most preferably, the clip is formed of a single continuous piece dependant on a case of said unit. The single contiguous piece clip is preferably one formed with the back cover of the unit.

The audio record circuit comprises two distinct actuators in order to initiate a record sequence. In one embodiment, the distinct actuators are located on different sides of said unit. Preferably, the first actuator is a multi-position switch and a second actuator is an electronic contact initiated by a push button.

Also contemplated in the subject application is a method for providing a personalized audio for a book comprising the steps of:
  a) initiating an audio recording in an interactive voice recorder unit;
  b) starting and completing the reading of a story;
  c) storing a digital audio file of said reading;
  d) clipping said interactive voice recorder unit to the inside cover of a book by a clip dependant on said interactive voice recorder unit; and
  d) opening the front cover of a book in which an interactive voice recorder unit comprising a light sensing actuator has been clipped, said opening of said book initiating an audio playback mode in said interactive voice recorder.

In one embodiment, the method has the initiating said audio recording comprising initiating two separate actuators to commence said audio recording.

In a preferred embodiment, the recording circuit is a digital recorder attached to the storybook.

In one embodiment, the recording may be created remotely, stored on computer readable media, and introduced to the playback unit for use with a particular storybook.

In a preferred embodiment, the recording is a digital input for receiving recorded audio from a remote area.

In another preferred embodiment, the digital recording is made within audible proximity of the record/playback unit. In a preferred embodiment, the recording and playback means are part of a single unit. Alternatively, the recording and playback means may be contained in separate units.

In a preferred embodiment, the unit for playing a recording comprises at least one speaker.

The unit for playing a recording comprises at least one speaker on the outside of said storybook.

Alternatively, the unit for playing a recording comprises at least one speaker positionable outside the outer perimeter of said storybook. That is the speaker may be moved or adjusted into position to reduce obstruction of the sound, such that a listener easily understands the audio.

The present invention is also related to a method for customizing an audio storybook comprising the steps of:
  (a) initiating the recording of a story;
  (b) reading a story while said recording means is recording;
  (c) providing said recording with the text of the story recorded;
  (d) initiating playback of a recorded story through a light activated initiating means;
  (e) listening to playback of said recorded story.

For the purposes of shipping and storing, the light activator may be covered with an opaque cover such that the playback mechanism is not activated.

The present invention relates to an audio unit for a book. A desired narrator may personalize the audio unit of the present invention. In one preferred embodiment, a parent, grandparent, or other person desired by a child may record the text of a book. The narrator can read a story and record their voice by any acceptable means. In one embodiment, the recorded media and playback are self-contained within a single unit. The single unit comprises a digital recording and playback mechanism. Alternatively, the playback unit may be equipped with a media reader for reading an audio file created independent of the playback unit. One such example would be digital flash memory cards as are commonly used.

In a preferred embodiment, the playback comprises an audio output and a light sensor for initiating playback. Alternatively, the playback may include a manual actuator (e.g. a button or switch), for initiating playback of the recorded audio. In one embodiment, the playback is contained within a small case and may be placed inside the front cover a book. Once the book is opened in a lighted room, the audio playback is activated. The playback would be so configured as to not require actual sunlight, but a minimal amount of light such as the amount found in a lighted interior room.

The audio output may be any such output as to allow a user to hear the audio output. These may include a speaker incorporated into the playback unit, a wired or wireless headset, or a wired or wireless speaker located near the playback unit. In one embodiment, the playback unit comprises a wireless transmitter wherein the audio output may be sent to a headphone or speaker not physically attached to the playback unit. In another embodiment, the audio output for playing a recording comprises at least one speaker positionable outside the outer perimeter of said storybook. This embodiment would comprise a speaker attached to a movable support whereby the movable support positions the speaker into a position such that the pages of the book may be turned without covering the speaker and thus interfering with the audio output.

The present invention further comprises a method whereby a person may record a story on an interactive voice recorder. The person will initiate the recording mode by a two-step process comprising the steps of:

Step 1

Moving a toggle switch into a recorder position.

Step 2

Pressing a record button that is in a different position from the toggle switch. Preferably, the record button is on a different side of the interactive voice recorder unit. Once the button is pressed, an indicator will notify the person making the recording that the unit is presently in record mode. This may be preferably by an indicator light. The person will then record the text of a book and may include any personal comments addressed to an intended reader/user of the interactive voice recorder unit with a particular book, including instruction on when to turn a page. When the person using the interactive voice recorder unit is finished, they will move the toggle switch from the record position into either a play or off position. Then the person who made the recording preferably would clip the interactive voice recorder unit to the inside cover of the book in which the text has been recorded. The intended user of the book with interactive voice recorder unit is typically a child and most preferably a small child to whom story books are typically read. When the cover of the book is opened the light activates the light sensitive actuator and the playback sequence is initiated from the interactive voice recorder unit. The person then follows along with the reading of the story, including directions as to when to turn a page.

An apparatus comprises in combination a storybook and a separate audio recorder adapted for detachably mounting on the storybook.

The recorder may be used with any one of several storybooks by recording the storyline of a first book, allowing the recording to be heard, subsequently erasing the recorded first book by recording a subsequent book over the recorded first book.

An objective of the present invention is to provide an apparatus and method of use of such apparatus that provides advantages not taught by the prior art.

Another objective is to provide an apparatus and method to enable a young reader to hear as well as read a story in a storybook.

An objective is to provide an apparatus and method to enable a young reader to hear a loved one read the storybook in absentia.

Another objective is to provide such an invention capable of being used with one or more books.

Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Figure 1:
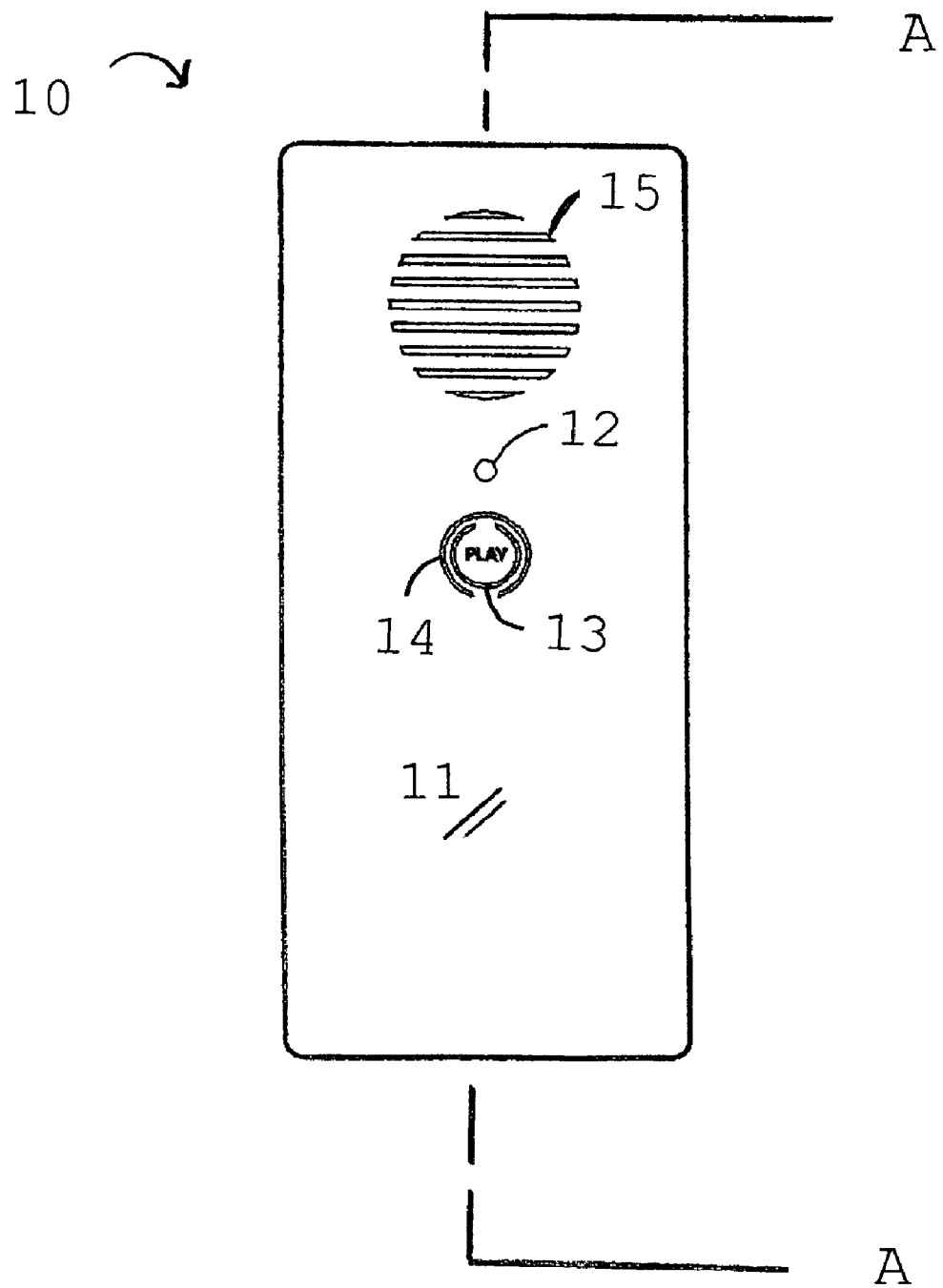
FIG. 1 is a front view of the voice/sound recording/playback unit.
Figure 2:
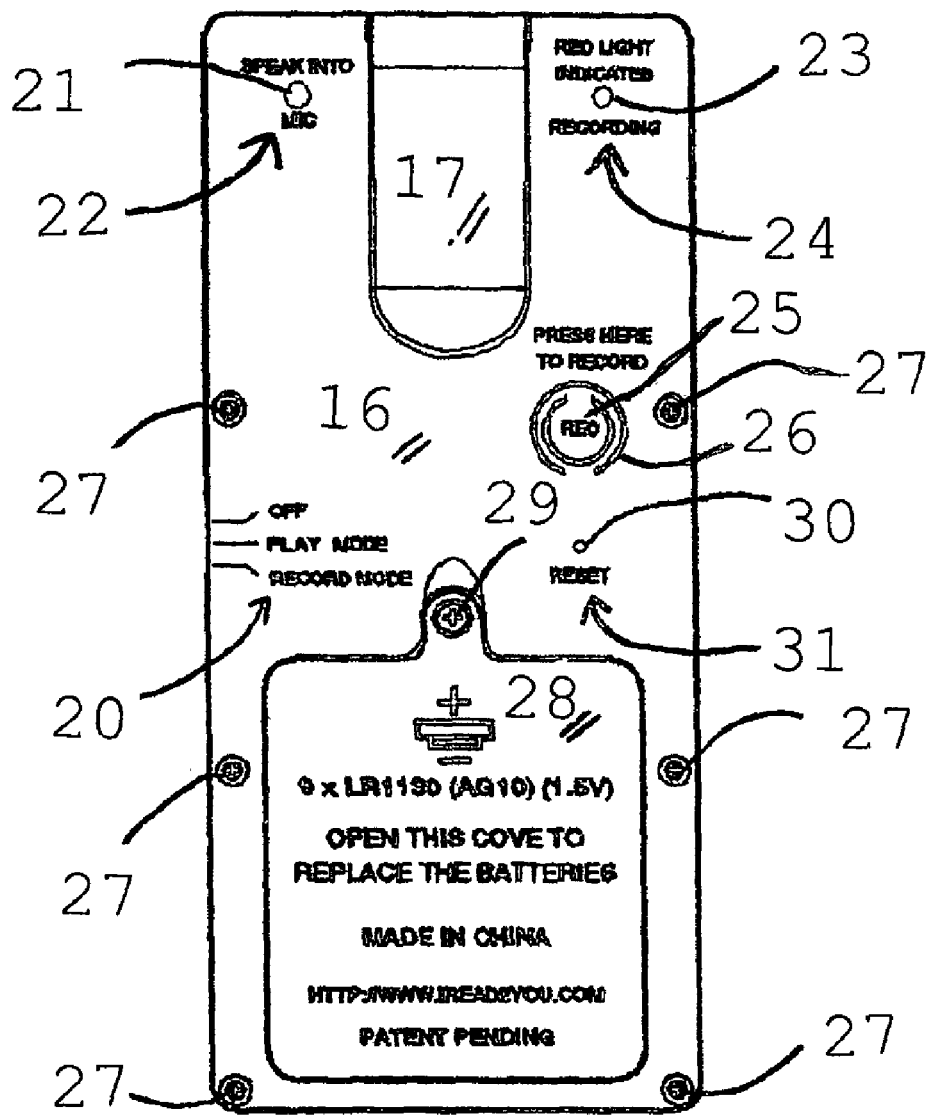
FIG. 2 is a rear view of said unit.
Figure 3:
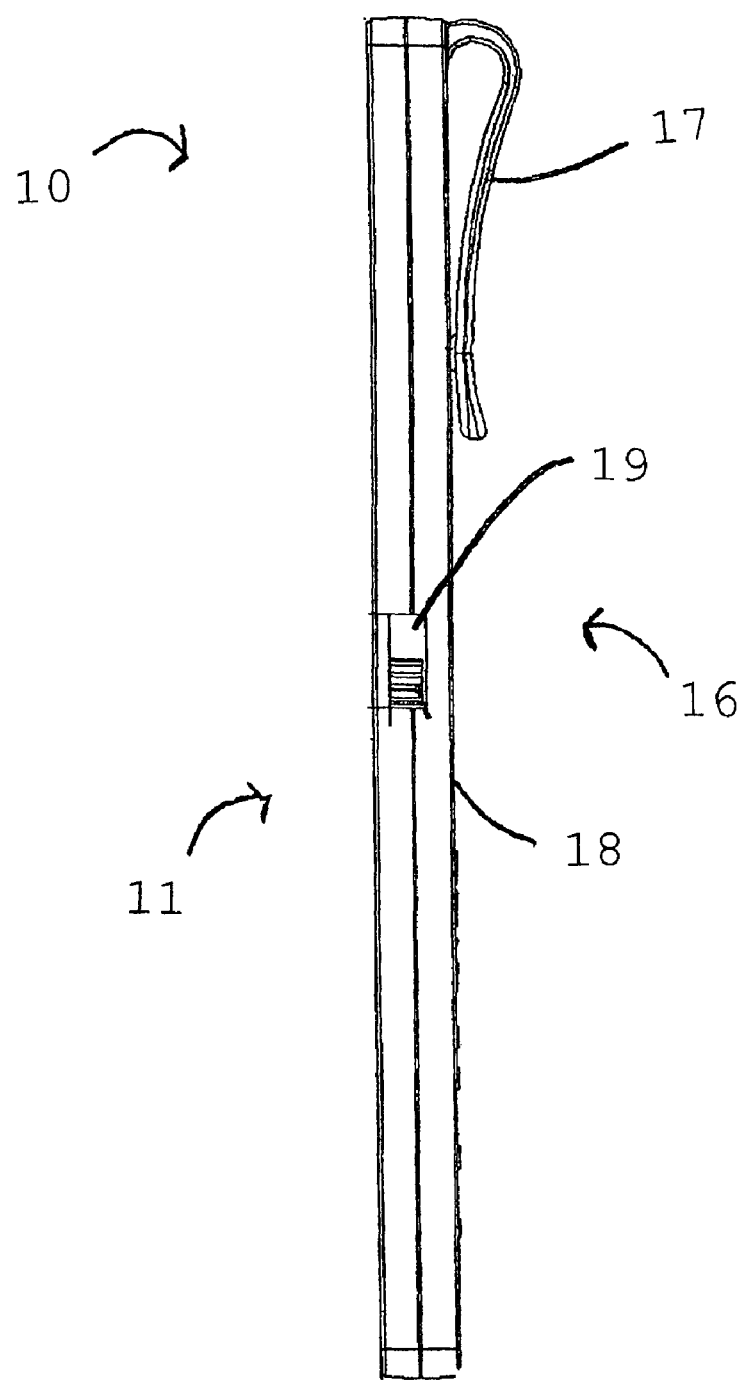
FIG. 3 is a side view of said unit.
Figure 4:
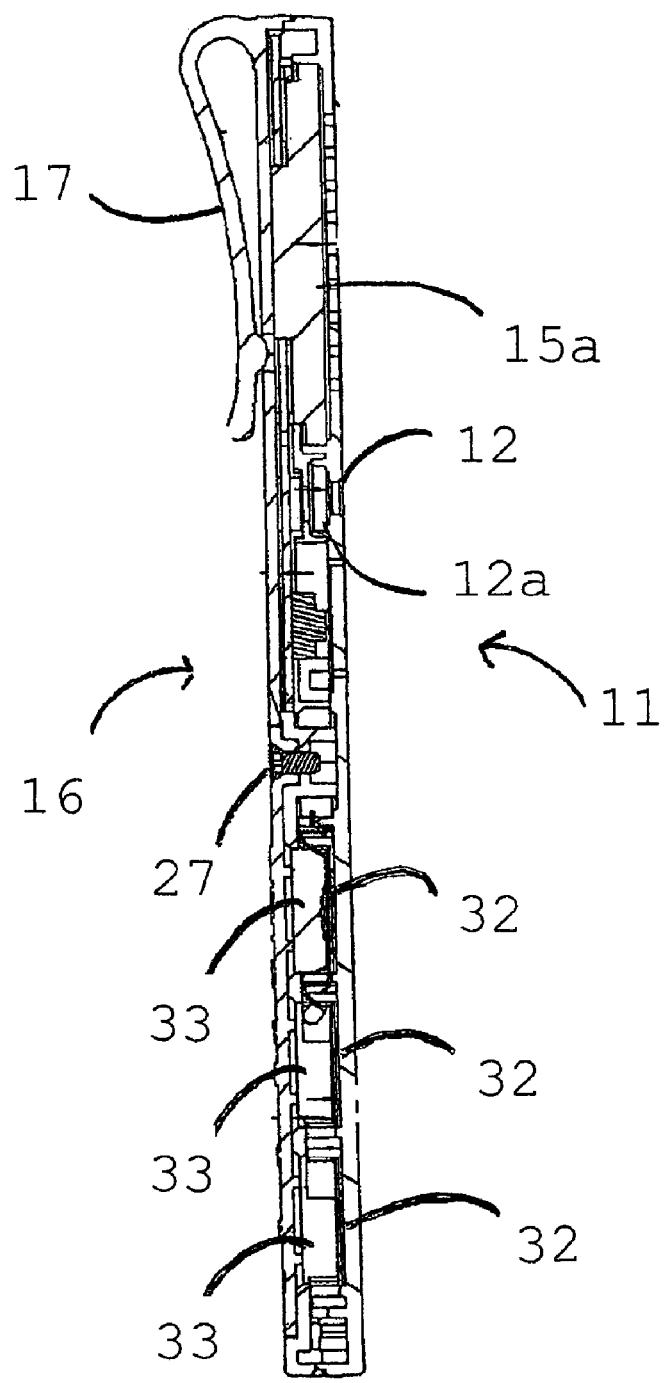
FIG. 4 is a longitudinal cross-section view along section A-A of FIG. 1.

Sound unit 10 has front face front portion 11 and a rear face portion 16. Said front portion 11 includes a light sensor opening 12 which contains a light sensing actuator 12a. Actuator 12a is the mechanism and associated electrical circuits well-known in the art, by which the record playback is initiated when Actuator 12a is in a lighted environment. Said front portion 11 further including a play button 13 with a play button periphery 14 circumferentially around said play button 13.

Said front portion 11 further including an audio speaker grill 15 configured to cover audio speaker 15a.

Said front portion 11 and back portion 16 are connected by connecting screws 27. At the interface of said connection, on one longitudinal side of unit 10, is a switch channel 19 that guides a three position switch 18 such that it points to one of off position, play position, or recorder position, as shown by switch indicia 20.

Back portion 16 further has clip 17 for securing unit 10 preferably, to the inside cover of a book. Unit 10 may also be secured between any book pages or outside the book. Microphone opening 21 provides a channel to a microphone which the user identifies by microphone indicia 22. Record indicator light 23 is designated to the user by recording light indicia 24. Record button 25 is encompassed by record button periphery 26.

Rear portion 16 further has battery door 28 which is secured by battery door securing screw 29. Under battery door 28 on the interior of unit 10 is at least one battery compartment 32 in which battery 33 is placed. Battery compartment 32 has appropriate electrical contacts, as is known in the art, to supply electrical power to unit 10. A user will take unit 10 and move three position switch 18 into record mode as indicated by position switch indicia 20. Once switch 18 is moved to record mode, the user will press record button 25 and speak into microphone opening 21 as indicated by microphone indicia 22. The user will recite for recordation, all or a portion of the text of a particular book including any personalized comments that may be desired.

Personalized comments may include but will not be limited to addressing an intended user by name, indicating when to turn a page, and the like.

The user who will record the audio in the device and will then move position switch 18 into the position indicated for a record mode by indicia 20. The person making the recording will then press record button 25 and observe light 23 illuminate. After light 23 has illuminated the person making the audio recording will speak and the voice will be introduced into the record mechanism of the device through microphone 21. The unit has memory storage as is known in the art. The memory may be incorporated into the unit, or alternatively, may be introduced to the unit through any acceptable means as is known in the art such as flash memory and the like. In one embodiment, the unit may have a reader for reading digital audio files created outside the unit and playing the digital files through the unit as an audio output.

Figure 5:
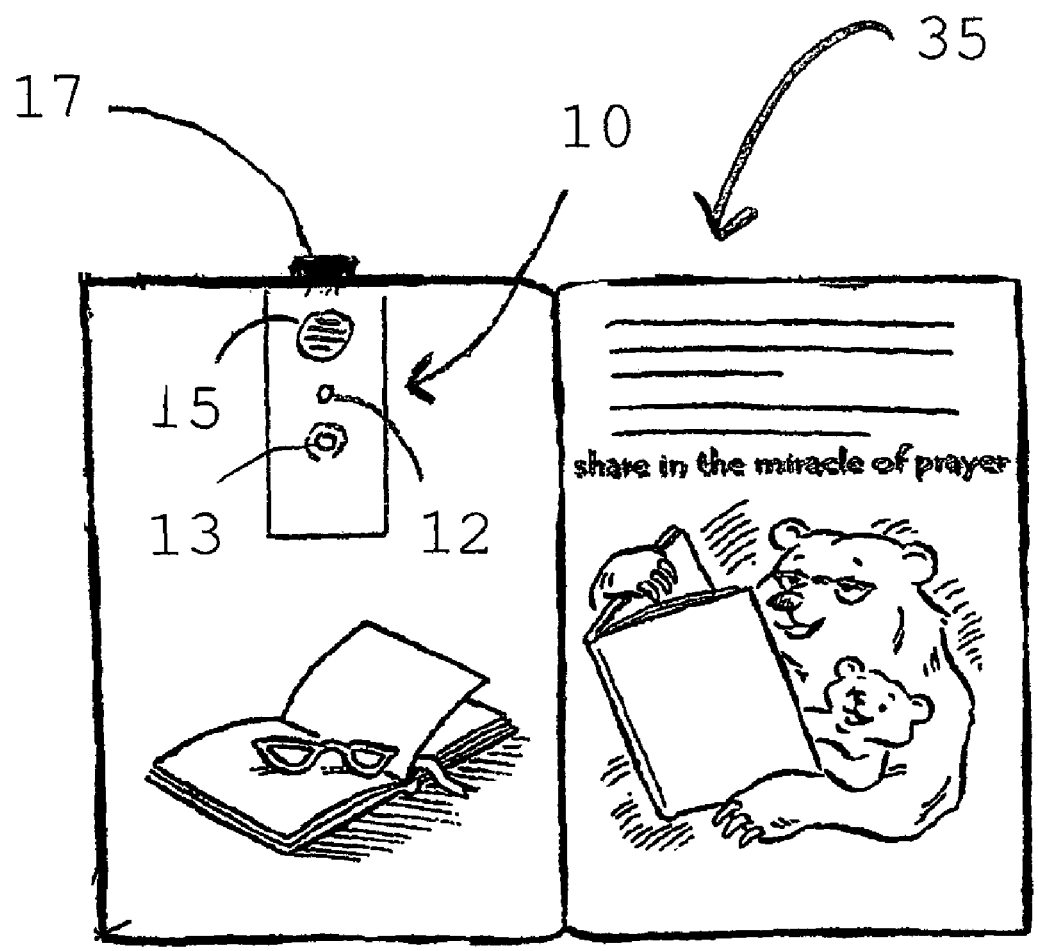
FIG. 5 is the unit of the invention positioned on the inside cover of a book.

In one embodiment, as seen in FIG. 5, unit 10 is secured to the inside cover of book 35.

When the audio portion is completed the person making the recording will move position switch 18 into either the off or play positions as indicated by indicia 20. The audio unit will then be secured to the inside front cover of a book by positioning clip 17 on the outside of the front cover of a book and having front portion 11 facing the reader of said book when the front cover is opened.

When a reader opens the book the light will enter through light sensor opening 12 and will initiate light sensing actuator 12a. Actuator 12a does not require bright sunshine, but is configured to begin the playback in normal indoor lighting. The activation of actuator 12a will initiate a play function and audio will be heard emanating from speaker 15a which is contained behind speaker grill 15. Playback originates from the memory source where recorded audio had previously been stored.

User will observe record light 23 in the area designated by record light indicia 24 to ensure the unit is indicating current recording before user begins to recite text, other desired information, and/or the text of a particular story. When the user is finished, switch 18 will be placed in either off position or play position. Unit 10 is secured to the inside cover of a book by clip 17 with rear portion 16 facing the book and front portion 11 facing away from the book.

When an intended reader opens the book, light enters through light sensor opening 12 and indicates light sensor actuator 12a contained therein. The audio previously recorded emanates through audio speaker grill 15 from audio speaker 15a. The audio unit 10 continues to play the previously recorded material, even when pages are turned and the unit is no longer exposed to light. The light initiates the audio playback, but is not required to continue the playback.

While the invention has been described in its preferred form or embodiment with some degree of particularity, it is understood that this description has been given only by way of example and that numerous changes in the details of construction, fabrication, and use, including the combination and arrangement of parts, may be made without departing from the spirit and scope of the invention.

We claim:

1. A interactive digital recording and playback unit for providing audio to a book, said unit comprising;

a) a microphone;

b) an audio recording circuit for converting an audio signal input into said unit into a digital audio file;
c) a memory to receive and store said digital audio file;
d) an audio playback circuit;
e) a light sensing actuator for initiating said playback, wherein said light sensing actuator initiates audio playback when exposed to light and said audio playback continues to play audio independent of any continual source of light; and
f) a clip for securing said unit to said book.

2. The article of claim 1 wherein an actuator for said audio record circuit and an actuator for said audio playback are on opposite sides of said unit.

3. The unit of claim 1 wherein said light sensing actuator initiates an audio playback of prerecorded information.

4. The article of claim 1 wherein said unit with said clip is configured to fit on the inside cover of said book.

5. The article of claim 4 wherein said clip is formed of a single continuous piece dependant on a case of said unit.

6. The article of claim 1 wherein said audio record circuit comprises two distinct actuators in order to initiate a record sequence.

7. The unit of claim 6 wherein said distinct actuators are located on different sides of said unit.

8. The unit of claim 6 wherein one of said actuators is a multi-position switch and a second actuator is an electronic contact initiated by a push button.

9. The unit of claim 1 wherein said memory to receive said digital audio file is created outside the unit and is introduced to the unit for playback as an output of an audio sound file.

10. A method for providing a personalized audio for a book comprising the steps of:
    a) initiating an audio recording in an interactive voice recorder unit;
    b) starting and completing the reading of a story;
    c) storing a digital audio file of said reading;
    d) clipping said interactive voice recorder unit to the inside cover of said book by a clip dependant on said interactive voice recorder unit; and
    e) opening the front cover of said book in which an interactive voice recorder unit comprising a light sensing actuator has been clipped, said opening of said book initiating an audio playback mode in said interactive voice recorder, wherein said light sensing actuator initiates audio playback when exposed to light and said audio playback continues to play audio independent of any continual source of light.

11. The method of claim 10 wherein said initiating said audio recording comprises initiating two separate actuators to commence said audio recording.

* * * * *